US012712709B2

(12) United States Patent
Peddada

(10) Patent No.: US 12,712,709 B2
(45) **Date of Patent: *Aug. 18, 2026**

(54) MULTI-TENANT HARDWARE-BACKED TRANSPORT LAYER SECURITY KEY MANAGEMENT

(71) Applicant: Salesforce, Inc., San Francisco, CA (US)

(72) Inventor: Prasad Peddada, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 18/426,139

(22) Filed: Jan. 29, 2024

(65) Prior Publication Data

US 2024/0421982 A1 Dec. 19, 2024

Related U.S. Application Data

(60) Provisional application No. 63/523,913, filed on Jun. 28, 2023, provisional application No. 63/508,805, filed on Jun. 16, 2023.

(51) Int. Cl.
*H04L 9/08* (2006.01)
*H04L 9/14* (2006.01)
(Continued)

(52) U.S. Cl.
CPC .......... *H04L 9/0825* (2013.01); *H04L 9/0866* (2013.01); *H04L 9/14* (2013.01); *H04L 9/3268* (2013.01); *H04L 63/166* (2013.01)

(58) Field of Classification Search
CPC ....... H04L 9/0825; H04L 9/0866; H04L 9/14; H04L 9/3268; H04L 63/166
See application file for complete search history.

(56) References Cited

U.S. PATENT DOCUMENTS 10,230,529 B2 3/2019 Costa et al.
11,258,617 B1 2/2022 Peddada et al.
(Continued)

FOREIGN PATENT DOCUMENTS

AU 2014342646 A1 5/2016
CN 109672522 B 7/2021
KR 10-2021-0151016 A 12/2021

*Primary Examiner* — Darshan I Dhruv
(74) *Attorney, Agent, or Firm* — Holland & Hart, LLP.

(57) ABSTRACT

Methods, systems, and devices for data processing are described. A server host may receive a request to access a web domain associated with a tenant of a multi-tenant cloud platform. The server host may retrieve a digital certificate and an encrypted private key associated with the tenant, where the digital certificate includes a public key associated with the tenant. The server host may obtain a symmetric key that is wrapped using an asymmetric public key associated with the server host. The wrapped symmetric key may be provisioned by a symmetric key distribution service. The server host may transmit a request that includes the encrypted private key and the wrapped symmetric key. The server host may receive a response that includes a cryptographic signature associated with the private key of the tenant. The server host may provide the digital certificate and the cryptographic signature to a client device associated with the request.

20 Claims, 11 Drawing Sheets

(51) Int. Cl.
*H04L 9/32* (2006.01)
*H04L 9/40* (2022.01)

(56) References Cited

U.S. PATENT DOCUMENTS

| | | | |
|---|---|---|---|
| 11,522,686 | B2 | 12/2022 | Peddada et al. |
| 11,626,985 | B1 * | 4/2023 | Copparapu ........... H04L 9/0822 713/164 |
| 12,362,917 | B2 | 7/2025 | Sabbu |
| 2003/0005317 | A1 | 1/2003 | Audebert et al. |
| 2012/0096271 | A1 | 4/2012 | Ramarathinam et al. |
| 2015/0318986 | A1 | 11/2015 | Novak et al. |
| 2015/0379259 | A1 | 12/2015 | Mohammed et al. |
| 2017/0237561 | A1 | 8/2017 | Nix |
| 2018/0287786 | A1 * | 10/2018 | Calahan ................ H04L 9/0861 |
| 2019/0052456 | A1 | 2/2019 | Bygrave et al. |
| 2019/0132299 | A1 * | 5/2019 | Tucker .............. H04W 12/0431 |
| 2019/0229908 | A1 | 7/2019 | Peddada et al. |
| 2021/0143991 | A1 | 5/2021 | Toal et al. |
| 2021/0226777 | A1 * | 7/2021 | Wilson .................. H04L 9/0861 |
| 2021/0359842 | A1 * | 11/2021 | Pillai ................... H04L 63/0823 |
| 2022/0014358 | A1 * | 1/2022 | Retaureau ............... H04L 9/085 |
| 2022/0014524 | A1 * | 1/2022 | Brown .................. H04L 63/045 |
| 2022/0021529 | A1 | 1/2022 | Chen |
| 2022/0182374 | A1 * | 6/2022 | Peddada ............. H04L 63/0807 |
| 2022/0247554 | A1 | 8/2022 | Peddada et al. |
| 2022/0329442 | A1 * | 10/2022 | Bulusu ................ H04L 63/1416 |
| 2023/0188362 | A1 * | 6/2023 | Niu ....................... H04L 9/0825 713/156 |
| 2023/0342277 | A1 | 10/2023 | Rosati et al. |
| 2024/0073032 | A1 | 2/2024 | Sterbling et al. |
| 2024/0323034 | A1 | 9/2024 | Kumar |
| 2024/0422000 | A1 | 12/2024 | Peddada |
| 2024/0422150 | A1 | 12/2024 | Peddada |
| 2024/0422196 | A1 | 12/2024 | Peddada |

* cited by examiner

Provisioning

Intermediate Key 230

Symmetric Key Distribution Service 205

API Call

Host Public Key 220

Symmetric Key 225

API Response

Symmetric Key 225

210

Symmetric Key 225

Database

215

Root

Symmetric Key 225

Host 1

Symmetric Key 225

200

Wrapped Using Intermediate Key 230

Wrapped Using Host Public Key 220

MULTI-TENANT HARDWARE-BACKED TRANSPORT LAYER SECURITY KEY MANAGEMENT

CROSS REFERENCES

The present Application for Patent claims the benefit of U.S. Patent Application No. 63/508,805 by Peddada, entitled "MULTI-TENANT HARDWARE-BACKED TRANSPORT LAYER SECURITY KEY MANAGEMENT," filed Jun. 16, 2023, and U.S. Patent Application No. 63/523,913 by Peddada, entitled "MULTI-TENANT HARDWARE-BACKED TRANSPORT LAYER SECURITY KEY MANAGEMENT," filed Jun. 28, 2023, each of which are assigned to the assignee hereof and expressly incorporated by reference herein.

FIELD OF TECHNOLOGY

The present disclosure relates generally to database systems and data processing, and more specifically to multi-tenant hardware-backed transport layer security (TLS) key management.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud-based system may use transport layer security (TLS) to secure communications between a server host and a user device. In some cases, however, TLS encryption may terminate before the communications reach the destination (i.e., the server host), which can result in data being exposed, intercepted, tampered with, etc.

DETAILED DESCRIPTION

Figure 1:
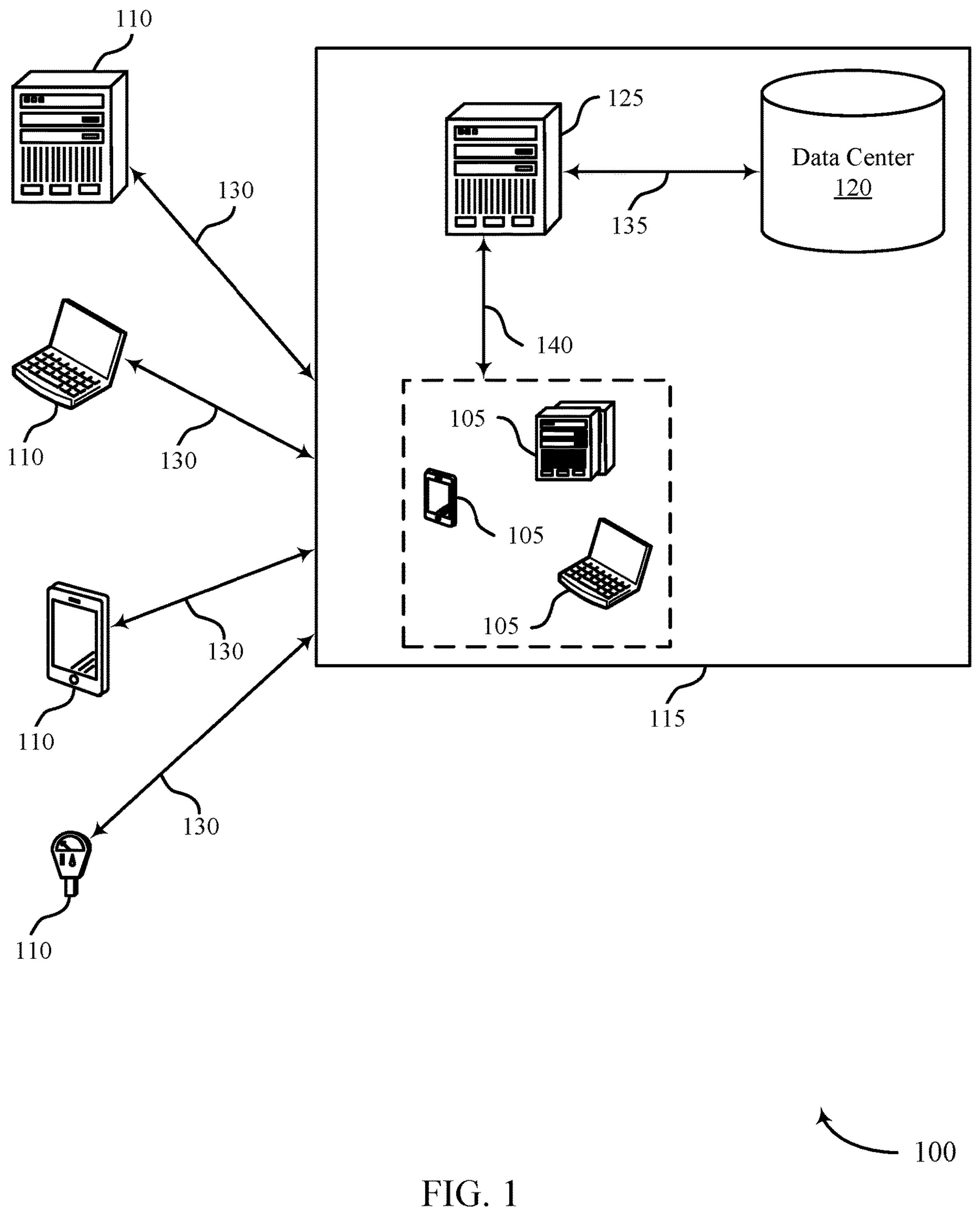
FIG. 1 illustrates an example of a computing system that supports multi-tenant hardware-backed transport layer security (TLS) key management in accordance with aspects of the present disclosure.

Transport layer security (TLS) is a widely used cryptographic protocol that provides secure communication over a network by establishing an encrypted and authenticated connection between a client (such as a web browser) and a server (also referred to herein as a server host or an application server). TLS works through a series of steps that are collectively known as a TLS handshake. In a TLS handshake, the server sends its digital certificate to the client, which includes a public key of the server. Accordingly, the client may use the public key to verify the authenticity of the server's certificate, and to ensure that the certificate is valid and issued by a trusted Certificate Authority (CA). Once verified, the client and server can establish a shared secret key that can be used for symmetric encryption of data thereafter.

In some cases, however, TLS encryption may terminate before the data reaches the server. For example, in some networks, communications may be encrypted until they reach a load balancer (i.e., a network entity that distributes incoming network traffic across a group of servers according to traffic levels and resource availability), at which point they may flow in clear (i.e., unencrypted) from the load balancer to the server. Passing unencrypted data from the load balancer to the server (and vice versa) can result in data being exposed, intercepted, tampered with, etc.

Aspects of the present disclosure generally provide for using hardware-backed encryption techniques to improve the security, efficiency, and scalability of conventional TLS schemes. In accordance with the techniques described herein, a server host may receive a request to access a web domain associated with a tenant of a multi-tenant cloud platform. The server host may retrieve, from a database, a digital certificate (also referred to as a TLS certificate or a public key certificate) and an encrypted private key associated with the tenant. The server host may obtain a symmetric key (such as an Advanced Encryption Standard (AES) key) that is wrapped with an asymmetric public key (such as a Rivest-Shamir-Adleman (RSA) public key) of the server host. The wrapped symmetric key may be provisioned by a symmetric key distribution service. As used herein, the terms "wrapping" and "wrapped" refer to the cryptographic process of using symmetric encryption algorithms known as key wrap constructions to encapsulate (i.e., wrap) cryptographic key material. Although some implementations of the subject matter described in this disclosure can be accomplished using key wrapping techniques, it is to be understood that other approaches (such as key agreement approaches) can also be used to accomplish substantially the same result. For example, in accordance with a key agreement approach, two parties or systems may be associated with respective elliptic-curve key pair, and the two parties or systems may derive a shared secret using an anonymous key agreement scheme, such as an Elliptic Curve Diffie-Hellman (ECDH) Key Exchange scheme. The shared secret may be used as or as the basis of a key, such as the symmetric key described herein.

Accordingly, the server host may transmit, to a key protection component, an application programming interface (API) call that includes the encrypted tenant-specific private key along with the wrapped symmetric key provisioned by the symmetric key distribution service. Thereafter, the server host may receive an API response that includes a cryptographic signature (equivalently referred to as a digital signature) associated with the tenant-specific private key. The server host may provide the cryptographic signature and the digital certificate to the client(s) that requested access to the web domain of the tenant. The client may use the digital certificate to validate (i.e., verify) the authenticity of the digital certificate.

Aspects of the present disclosure may be implemented to realize one or more of the following advantages. In some implementations, using a hardware-based encryption scheme to store and manage tenant-specific private keys within a multi-tenant cloud system may reduce the likelihood of data being compromised, stolen, intercepted, etc. In particular, the described techniques may improve the overall security of the multi-tenant cloud system by terminating TLS encryption at the destination (i.e., the server host), thereby ensuring that data does not flow in clear (e.g., unencrypted) at any point between the client and the server host. The described techniques may also promote greater security and isolation between tenants of the multi-tenant cloud system, as each tenant may be provisioned with their own tenant-specific, hardware-backed private key.

Aspects of the disclosure are initially described in the context of data processing systems, computing systems, and process flows. Aspects of the disclosure are further illustrated by and described with reference to apparatus diagrams, system diagrams, and flowcharts that relate to multi-tenant hardware-backed TLS key management.

FIG. 1 illustrates an example of a computing system 100 for cloud computing that supports multi-tenant hardware-backed TLS key management in accordance with various aspects of the present disclosure. The computing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction. The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

A subsystem (e.g., pod) may include cloud clients 105, cloud platform 115, and data center 120. In some cases, data processing may occur at any of the components of a subsystem, or at a combination of these components. In some cases, servers may perform the data processing. The servers may be a cloud client 105 or located at data center 120.

The computing system 100 may be an example of a multi-tenant system. For example, the computing system 100 may store data and provide applications, solutions, or any other functionality for multiple tenants concurrently. A tenant may be an example of a group of users (e.g., an organization) associated with a same tenant identifier (ID) who share access, privileges, or both for the computing system 100. The computing system 100 may effectively separate data and processes for a first tenant from data and processes for other tenants using a system architecture, logic, or both that support secure multi-tenancy. In some examples, the computing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the computing system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the computing system 100 may support any configuration for providing multi-tenant functionality. For example, the computing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The computing system 100 may support scaling of tenants within the multi-tenant system, for example, using scale triggers, automatic scaling procedures, scaling requests, or any combination thereof. In some cases, the computing system 100 may implement one or more scaling rules to enable relatively fair sharing of resources across tenants. For example, a tenant may have a threshold quantity of processing resources, memory resources, or both to use, which in some cases may be tied to a subscription by the tenant.

In some data processing systems, TLS termination happens on the load balancer, and traffic flows in clear between the load balancer and the application server 125. Using the techniques described herein, TLS encryption can be terminated on the application server 125, thereby offering better protection for customers and improved security. The described techniques may also enable the application server 125 to provide each tenant with their own TLS private key backed by hardware. In accordance with one or more aspects of the present disclosure, each tenant domain may be provisioned with a unique private key and certificate protected inside hardware. Each tenant/customer may select their own CA, as opposed to using a default CA. The described techniques may support commodity hardware-backed private key protection without relying on hardware security modules (HSMs). The hardware-backed key protection mechanisms disclosed herein offer better scalability and greater efficiency, as they may not rely on custom hardware to protect private keys.

It should be appreciated by a person skilled in the art that one or more aspects of the disclosure may be implemented to solve additional or alternative problems not specifically mentioned above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2A:
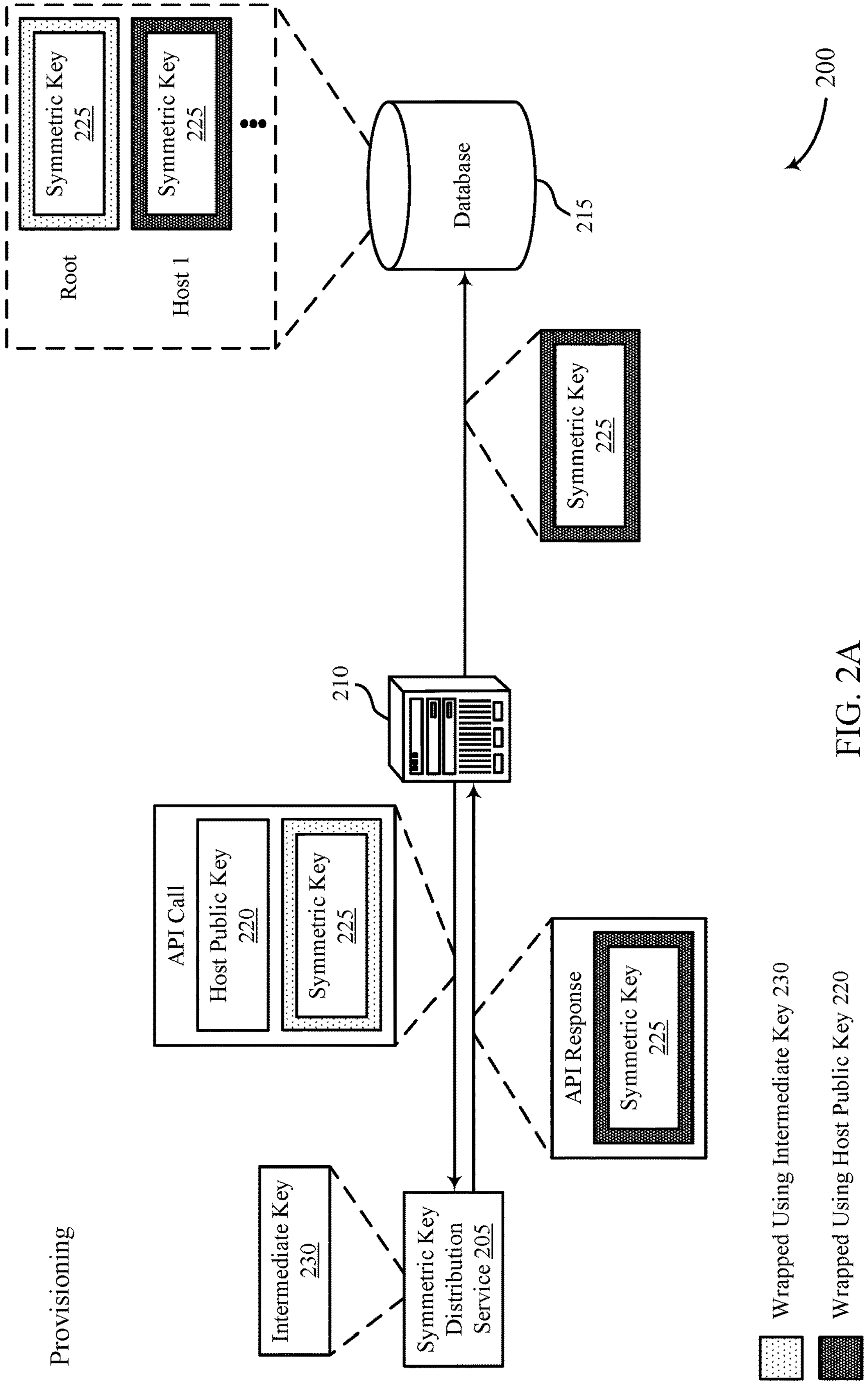
FIGS. 2A, 2B, and 2C show examples of computing systems that support multi-tenant hardware-backed TLS key management in accordance with aspects of the present disclosure.
Figure 2B:
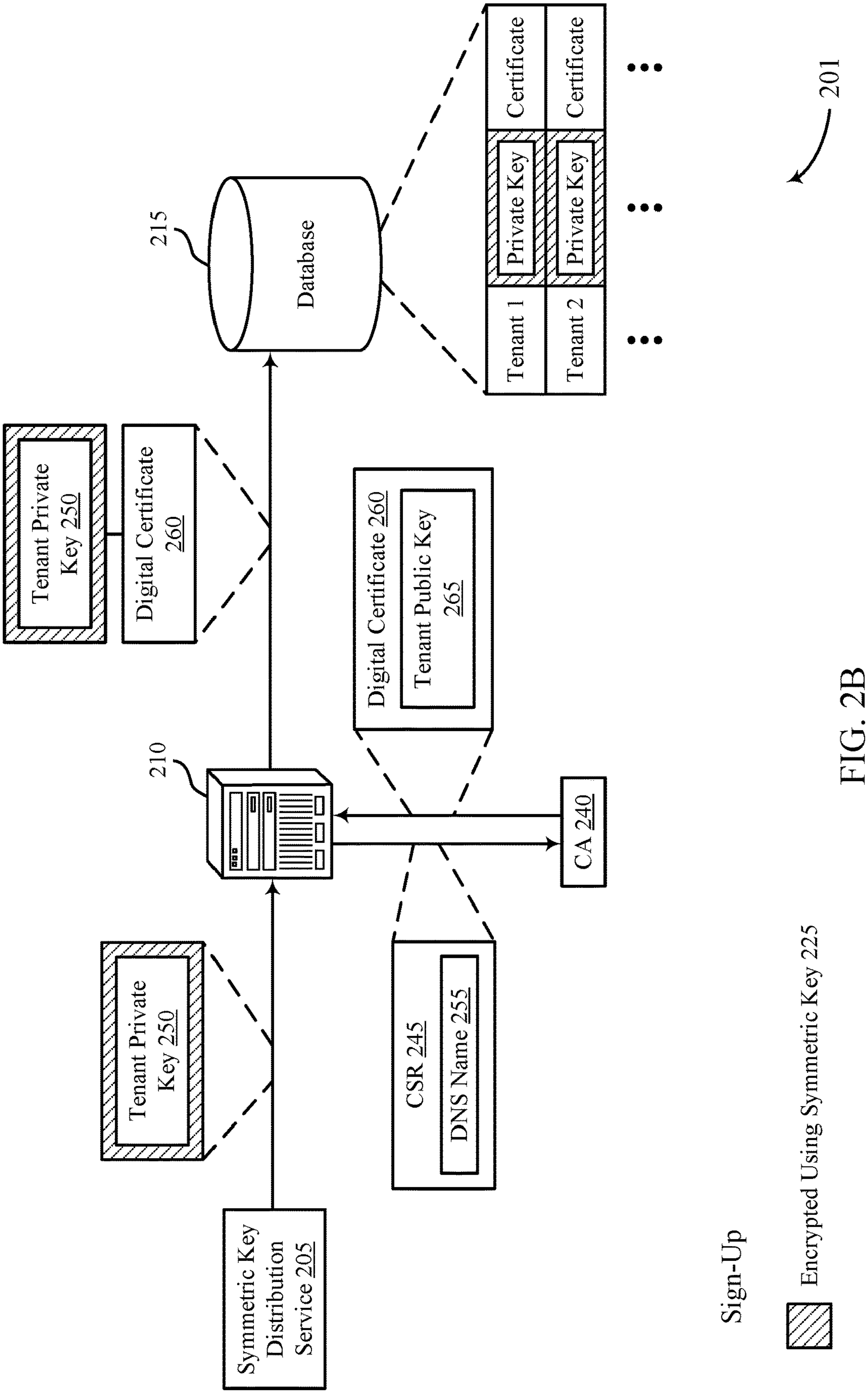
Figure 2C:
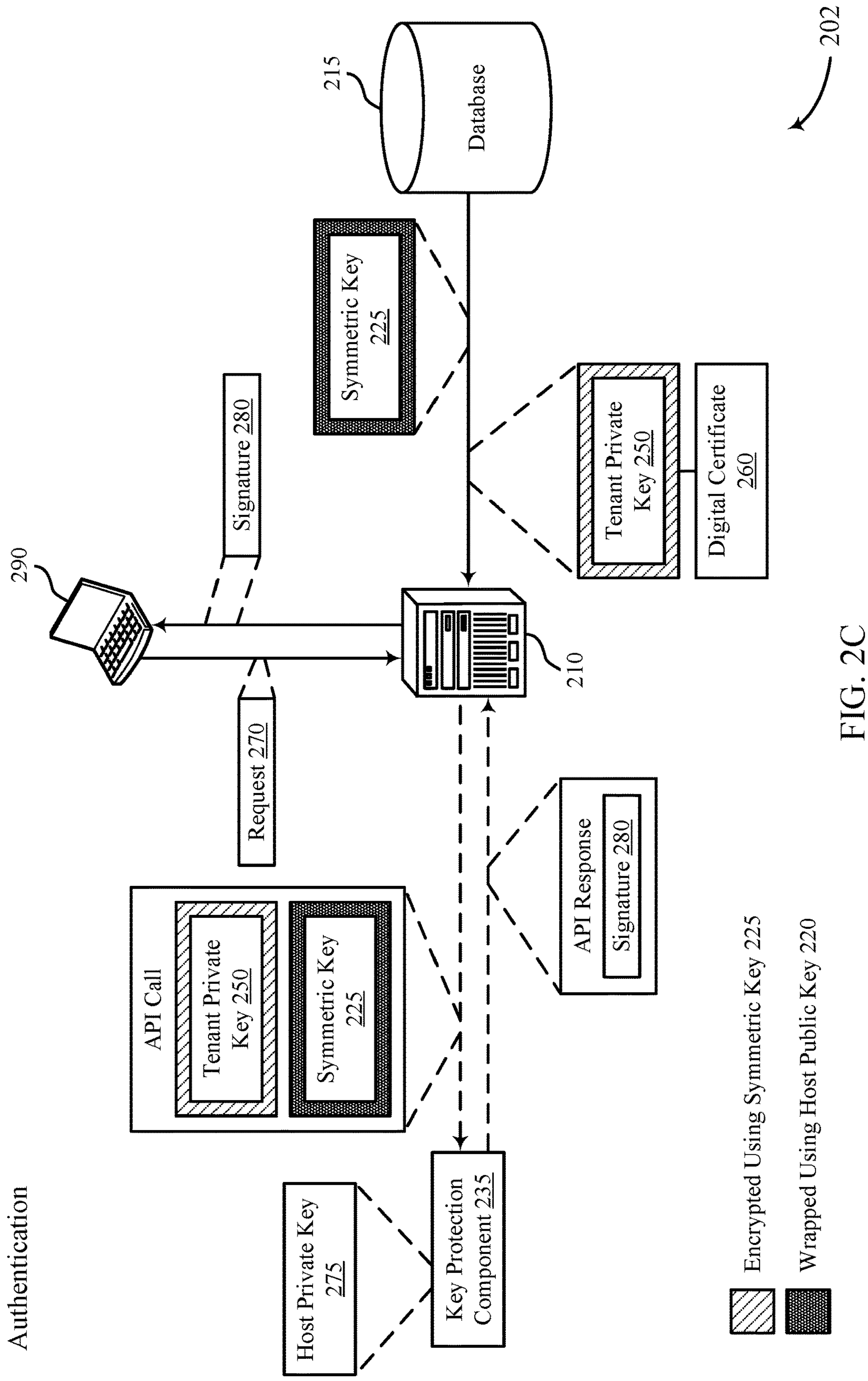

FIGS. 2A, 2B, and 2C show examples of a computing system 200, a computing system 201, and a computing system 202, respectively, that support multi-tenant hardware-backed TLS key management in accordance with aspects of the present disclosure. The computing systems 200 through 202 may implement or be implemented by aspects of the computing system 100. For example, the computing system 200 includes a server host 210, which may be an example of aspects of the application server 125 described with reference to FIG. 1. Likewise, the computing system 201 includes a database 215, which may be an example of aspects of the data center 120, as shown and described with reference to FIG. 1.

The computing system 200 of FIG. 2A illustrates an example of a key provisioning process, whereby a symmetric key distribution service 205 unwraps, rewraps, and returns a symmetric key 225 to the server host 210. Initially, the symmetric key 225 may be wrapped with an intermediate key 230 (also referred to as an HSM key) provisioned by the symmetric key distribution service 205. Only the symmetric key distribution service 205 has access to the intermediate key 230. The wrapped symmetric key 225 may be stored at the server host 210, the database 215, or both. The server host 210 may be configured with a host public key 220 (such as an RSA public key) and a corresponding host private key 275 (such as an RSA private key).

In the example of FIG. 2A, the server host 210 may transmit an API call that includes the host public key 220 (also referred to as the asymmetric public key of the server host 210) and the symmetric key 225 wrapped by the intermediate key 230 (denoted as $[\text{Symmetric}]_{Intermediate}$). Upon receiving the API call, the symmetric key distribution service 205 may unwrap the symmetric key 225 using the intermediate key 230 known only to the symmetric key distribution service 205, rewrap the symmetric key 225 using the host public key 220, and include the rewrapped symmetric key 225 (denoted as $[\text{Symmetric}]_{Host\ Public}$) in an API response to the server host 210. In some implementations, the symmetric key distribution service 205 may verify the identity of the server host 210 and/or the authenticity of the host public key 220 before returning the rewrapped symmetric key 225 to the server host 210. Upon receiving the API response from the symmetric key distribution service 205, the server host 210 may, in some implementations, store the rewrapped symmetric key 225 in the database 215.

In third-party (3P) deployments, the server host 210 may call (i.e., invoke) the symmetric key distribution service 205 each time the wrapped symmetric key 225 is needed (e.g., each time the server host 210 performs a TLS handshake). In first-party (1P) deployments, the wrapped symmetric key 225 may be stored in the database 215, along with other instances of the symmetric key 225 wrapped with public keys of other server hosts in a sub-system (i.e., pod) of the computing system 200. In other words, the database 215 may include a first instance of the symmetric key 225 wrapped with the intermediate key 230, a second instance of the symmetric key 225 wrapped with the host public key 220, a third instance of the symmetric key 225 wrapped with the public key of another server host, etc. Storing wrapped symmetric keys 225 in the database 215 may reduce the number of API calls made to the symmetric key distribution service 205, thereby resulting in lower signaling overhead and reduced latency.

The symmetric key distribution service 205 may be implemented as an HSM, a master host, or a quorum-based sharing service that uses a distributed key sharing scheme (such as a Shamir Secret Sharing scheme). The symmetric key distribution service 205 may enable the same key (e.g., the symmetric key 225) to be shared across different virtual and/or physical machines within the computing system 200. In some examples, the symmetric key distribution service 205 may be supported or otherwise provided by dedicated 1P hardware. For example, a first physical/virtual machine of a 1P data center (such as the data center 120 described with reference to FIG. 1) may wrap, unwrap, and rewrap the symmetric key 225 using public keys of other physical/virtual machines in the network.

In other examples, two or more entities (such as machines or humans) supporting the symmetric key distribution service 205 may jointly create the symmetric key 225 in accordance with a quorum-based key sharing scheme. The entities supporting the symmetric key distribution service 205 may be unable to create (i.e., generate) the symmetric key 225 unless a threshold number (M) of the entities (N) are present for the creation of the symmetric key 225, as the key material (e.g., the information necessary to create the symmetric key 225) may be distributed across the entities in such a way that any one entity is unable to create or otherwise access the symmetric key 225. Once created, the symmetric key 225 can be loaded into entity 1, entity 2 can obtain the symmetric key 225 from entity 1, etc. Other methods of creating/obtaining the symmetric key 225 are not precluded.

The computing system 201 of FIG. 2B illustrates an example of a tenant (i.e., organization) sign-up process, whereby the server host 210 obtains a tenant private key 250 (also referred to as a TLS private key) and a digital certificate 260 for a tenant of a multi-tenant cloud system. To begin the tenant sign-up process, the server host 210 may receive a sign-up or provisioning request from a user associated with the tenant (such as a user of the client device 290). Accordingly, the server host 210 may obtain the tenant private key 250 from the symmetric key distribution service 205. The tenant private key 250 may be encrypted using the symmetric key 225 provisioned by the symmetric key distribution service 205.

Accordingly, the server host 210 may identify a domain name system (DNS) name 255 for the web domain, and include the DNS name 255 in a certificate signing request (CSR) 245. The server host 210 may transmit the CSR 245 to a CA 240 (also referred to as a universal registration authority). The CA 240, which may be locally or externally hosted, may issue a digital certificate 260 for the web domain based on the information provided in the CSR 245.

The digital certificate 260 essentially contains a tenant public key 265 (also referred to as a TLS public key). By issuing the digital certificate 260, the CA 240 vouches for the tenant public key 265 associated with the tenant domain. Without a certificate provisioned by the CA 240, browsers may not trust the tenant private key 250. The host private key 275 (also referred to as the asymmetric private key of the server host 210) may be protected (i.e., secured) by the key protection component 235, such that the host private key 275 is not accessible or otherwise discoverable in the memory of the server host 210.

In turn, the server host 210 may store both the encrypted tenant private key 250 and the digital certificate 260 in the database 215. As shown in the example of FIG. 2B, the database 215 may include encrypted private keys and corresponding digital certificates for each tenant supported by the server host 210. In some examples, all tenant-specific private keys stored in the database 215 may be encrypted with the same AES key (such as the symmetric key 225).

The computing system 202 of FIG. 2C illustrates an example of a TLS authentication procedure, whereby a key protection component 235 of the server host 210 uses a tenant private key 250 provided by the server host 210 to generate a cryptographic signature 280 (also referred to as a digital signature). The key protection component 235 of the server host 210 (also referred to as a key management system) may support Intel® Quick Assist Technology (QAT), which includes Intel® Key Protection Technology (KPT), and these technologies may help accelerate data encryption and compression at the server host 210. For example, the key protection component 235 may provide hardware acceleration and CPU offloading capabilities for enhanced compression and decompression. The key protection component 235 may be implemented in hardware, software executed by at least one processor, firmware, or any combination thereof. Although the key protection component 235 is depicted as being separate from the server host 210, it is to be understood that the key protection component 235 may be physically integrated or otherwise co-located with other components of the server host 210.

To begin the authentication process, the server host 210 may receive (e.g., via a web browser or an application running on the client device 290) a request 270 to access a web domain associated with a tenant supported by the server host 210. Upon receiving the request 270, the server host 210 may retrieve (i.e., from the database 215) an encrypted tenant private key 250 and corresponding digital certificate 260 for the web domain specified in the request 270. The server host 210 may also obtain (e.g., from the database 215 or the symmetric key distribution service 205) the symmetric key 225 wrapped with the host public key 220, as shown and described with reference to FIG. 2A.

The server host 210 may pass the encrypted tenant private key 250 and the wrapped symmetric key 225 to the key protection component 235 via an API call. As described herein, the API call may be configured to cause the key protection component 235 to unwrap the symmetric key 225 using the host private key 275 accessible to the key protection component 235, decrypt the tenant private key 250 using the unwrapped symmetric key 225, and generate the cryptographic signature 280 using the decrypted tenant private key 250. As such, the key protection component 235 may be configured to perform signature computations for a given private key. Accordingly, the key protection component 235 may return the cryptographic signature 280 to the server host 210 via an API response.

In turn, the server host 210 may send the cryptographic signature 280 (provided by the key protection component 235) to the client device 290, which may validate the cryptographic signature 280. After determining that the cryptographic signature 280 is valid, the client device 290 may finish establishing a TLS connection with the server host 210 (for example, by performing a client key exchange, a client handshake, and other TLS operations that one of ordinary skill in the art would readily appreciate), at which point the client device 290 may exchange communications with the server host 210 in a secure manner. The TLS connection may be configured such that TLS encryption is terminated at the server host 210, thereby ensuring that data does not flow in clear (i.e., unencrypted) at any point between the client device 290 and the server host 210.

Figure 3A:
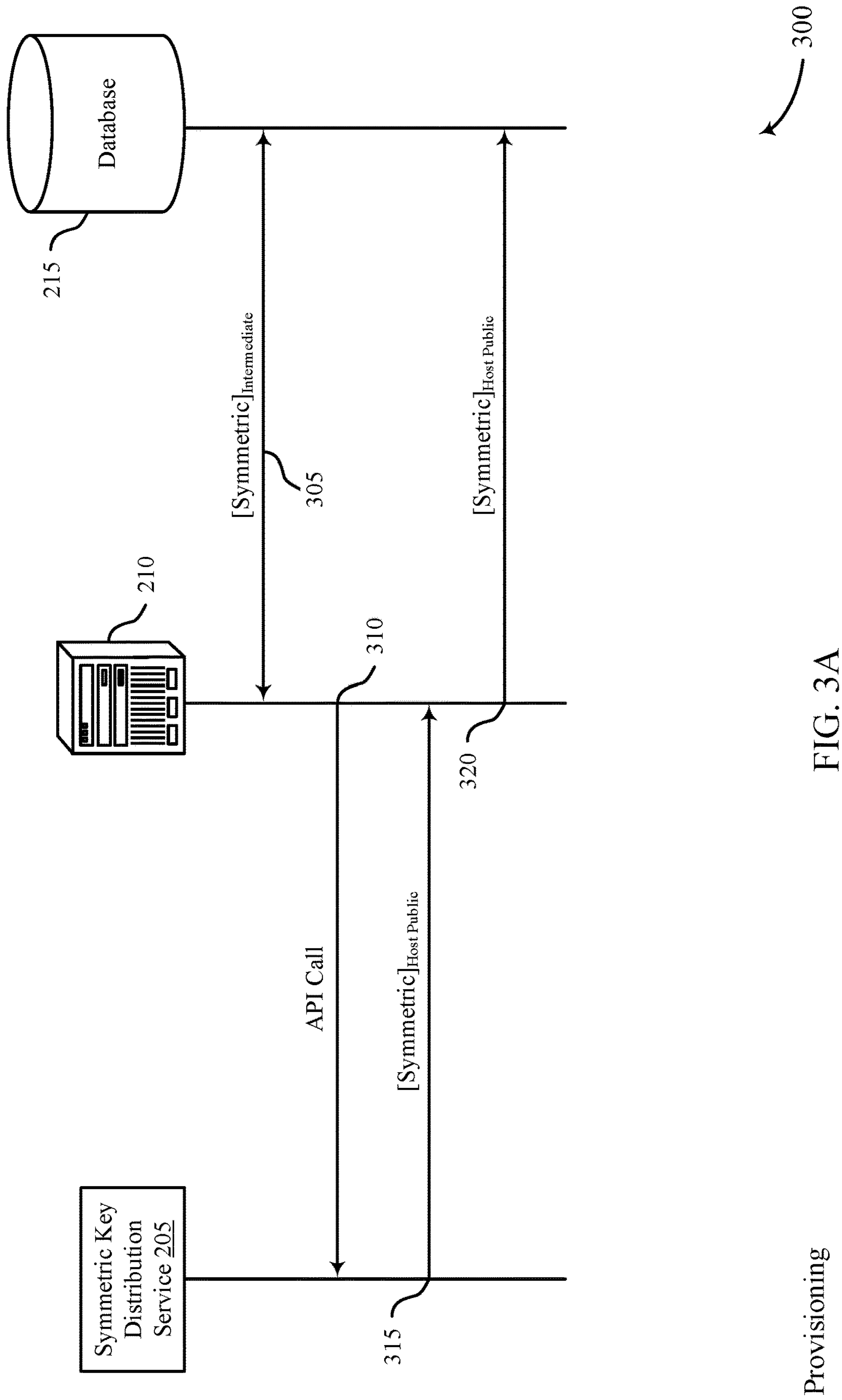
FIGS. 3A, 3B, and 3C show examples of computing systems that support multi-tenant hardware-backed TLS key management in accordance with aspects of the present disclosure.
Figure 3B:
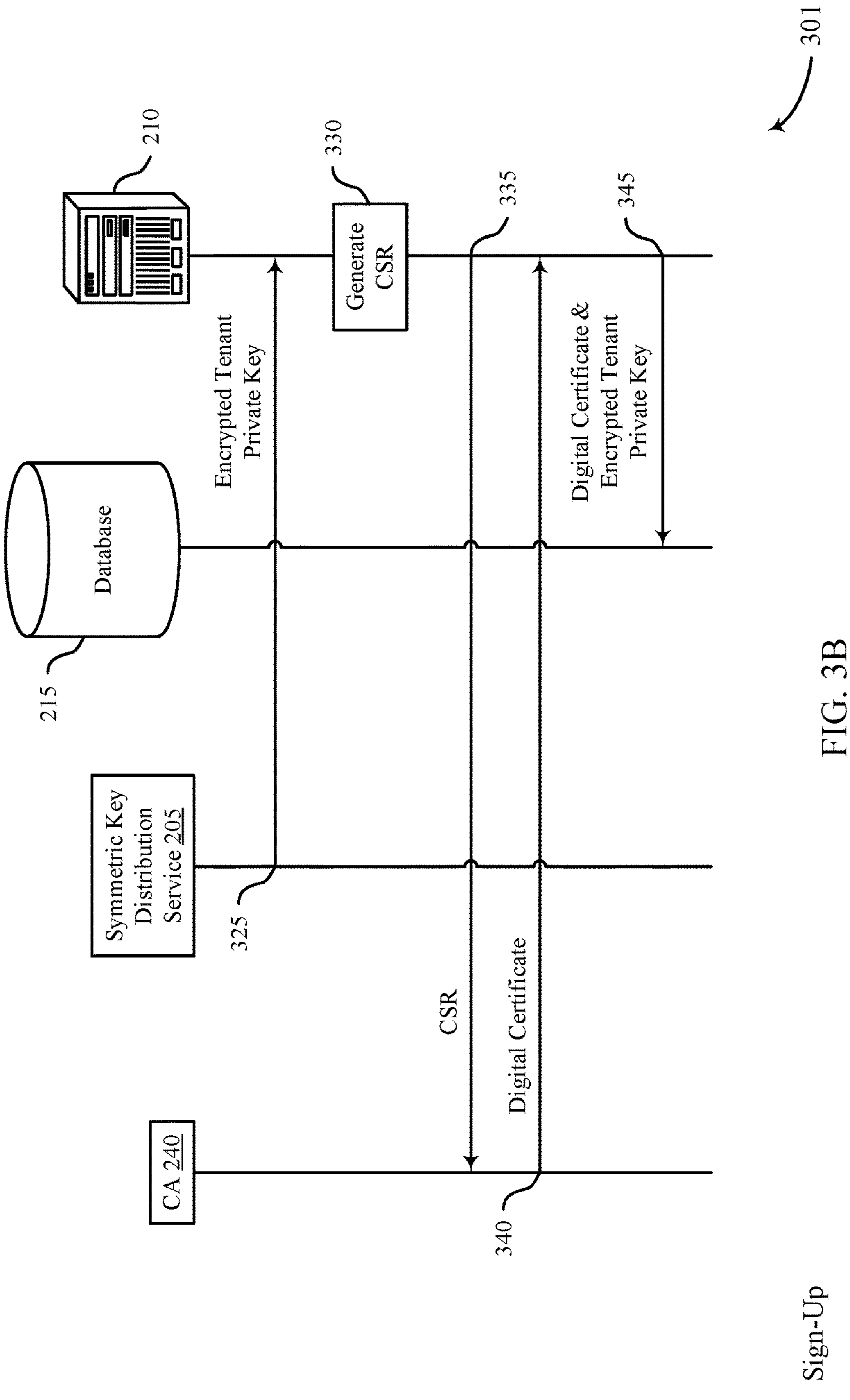
Figure 3C:
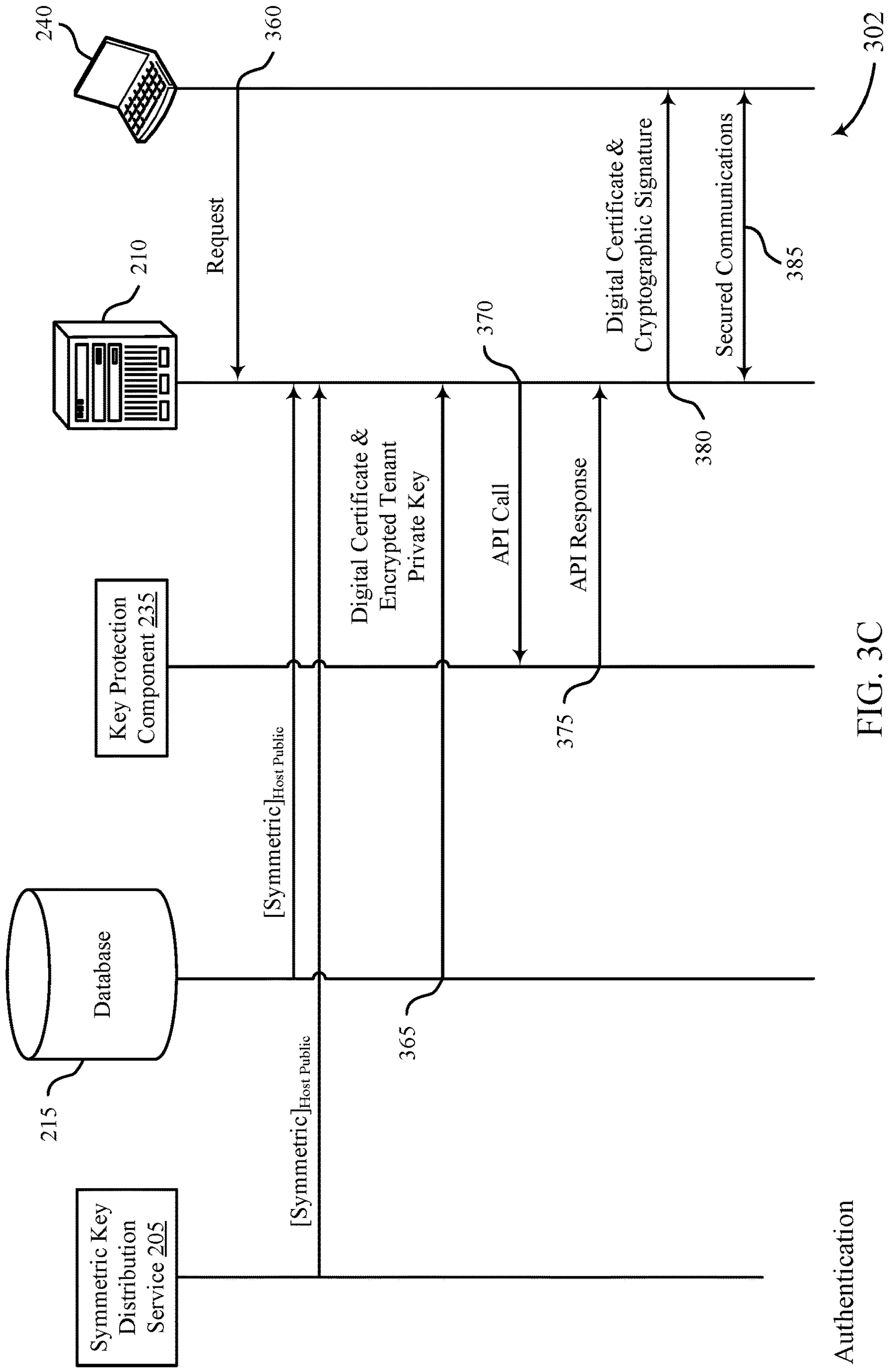

FIGS. 3A, 3B, and 3C show examples of a process flow 300, a process flow 301, and a process flow 302, respectively, that support multi-tenant hardware-backed TLS key management in accordance with aspects of the present disclosure. The process flows 300 through 302 may implement or be implemented by aspects of any of the computing systems 100 through 202. For example, the process flow 300 includes a server host 210 and a database 215, which may be examples of corresponding elements described herein, including with reference to FIGS. 2A through 2C. In the following description of the process flows 300 through 302, operations may be added, omitted, or performed in a different order (with respect to the exemplary order shown).

The process flow 300 of FIG. 3A illustrates an example of a key provisioning process, whereby a symmetric key distribution service 205 unwraps, rewraps, and returns a symmetric key 225 to the server host 210. Initially, the symmetric key 225 may be wrapped with an intermediate key 230 (also referred to as an HSM key) provisioned by the symmetric key distribution service 205. Only the symmetric key distribution service 205 has access to the intermediate key 230. At 305, the wrapped symmetric key 225 (denoted as $[\text{Symmetric}]_{Intermediate}$) may be stored at the server host 210, the database 215, or both. The server host 210 may be configured with a host public key 220 (such as an RSA public key) and a corresponding host private key 275 (such as an RSA private key).

At 310, the server host 210 may transmit an API call (also referred to as an API request) that includes the host public key 220 (also referred to as the asymmetric public key of the server host 210) and the symmetric key 225 wrapped by the intermediate key 230. Upon receiving the API call, the symmetric key distribution service 205 may unwrap the symmetric key 225 using the intermediate key 230 known only to the symmetric key distribution service 205, rewrap the symmetric key 225 using the host public key 220, and include the rewrapped symmetric key 225 (denoted as $[\text{Symmetric}]_{Host\ Public}$) in an API response to the server host 210. In some implementations, the symmetric key distribution service 205 may verify the identity of the server host 210 before returning the rewrapped symmetric key 225 to the server host 210 at 315. At 320, the server host 210 may, in some implementations, store the rewrapped symmetric key 225 in the database 215.

In 3P deployments, the server host 210 may call (i.e., invoke) the symmetric key distribution service 205 each time the wrapped symmetric key 225 is needed (e.g., each time the server host 210 restarts a TLS handshake). In 1P deployments, the wrapped symmetric key 225 may be stored in the database 215, along with other instances of the symmetric key 225 wrapped with corresponding asymmetric public keys of other server hosts in a sub-system (i.e., pod) of the computing system 200. In other words, the database 215 may include a first instance of the symmetric key 225 wrapped with the intermediate key 230, a second instance of the symmetric key 225 wrapped with the host public key 220, a third instance of the symmetric key 225 wrapped with the public key of another server host, and so on. Storing wrapped symmetric keys 225 in the database 215 may reduce the number of API calls made to the symmetric key distribution service 205, thereby resulting in lower signaling overhead and reduced latency.

The symmetric key distribution service 205 may be implemented as an HSM, a master host, or a quorum-based sharing service that uses a distributed key sharing scheme (such as a Shamir Secret Sharing scheme). The symmetric key distribution service 205 may enable the same key (e.g., the symmetric key 225) to be shared across different virtual and/or physical machines within the computing system 200. In some examples, the symmetric key distribution service 205 may be supported or otherwise provided by dedicated 1P hardware. For example, a first physical/virtual machine of a 1P data center (such as the data center 120 described with reference to FIG. 1) may wrap, unwrap, and rewrap the symmetric key 225 using public keys of other physical/virtual machines in the network.

In other examples, two or more entities (such as machines or humans) supporting the symmetric key distribution service 205 may jointly create the symmetric key 225 in accordance with a quorum-based key sharing scheme, such as a Shamir secret sharing scheme or a multi-party computation (MPC)-based scheme. In a Shamir secret sharing scheme, the symmetric key 225 may be recreated using an M out of N scheme. That is, the entities supporting the symmetric key distribution service 205 may be unable to create (i.e., generate) the symmetric key 225 unless a threshold number (M) of the entities (N) are present for the creation of the symmetric key 225, as the key material (e.g., the information necessary to create the symmetric key 225) may be distributed across the entities in such a way that any one entity is unable to create or otherwise access the symmetric key 225. Once created, the symmetric key 225 can be loaded into entity 1, entity 2 can obtain the symmetric key 225 from entity 1, etc. An MPC-based scheme requires multiple parties to be involved in computing a cryptographic function. Other methods of creating/obtaining the symmetric key 225 are not precluded.

The process flow 301 of FIG. 3B illustrates an example of a tenant (i.e., organization) sign-up process, whereby the server host 210 obtains a tenant private key 250 (also referred to as a TLS private key) and a digital certificate 260 for a tenant of a multi-tenant cloud system. To begin the tenant sign-up process, the server host 210 may receive a sign-up or provisioning request from a user associated with the tenant (such as a user of the client device 290). At 325, the server host 210 may obtain the tenant private key 250 from the symmetric key distribution service 205. The tenant private key 250 may be encrypted using the symmetric key 225 provisioned by the symmetric key distribution service 205.

At 330, the server host 210 may identify a DNS name 255 for the tenant, and include the DNS name 255 in a CSR 245. At 335, the server host 210 may transmit the CSR 245 to a CA 240 (also referred to as a universal registration authority). At 340, the CA 240 (which may be locally or externally hosted) may issue a digital certificate 260 for the tenant domain based on the information provided in the CSR 245.

The digital certificate 260 essentially contains a tenant public key 265 (also referred to as a TLS public key) provisioned by the CA 240. By issuing the digital certificate 260, the CA 240 vouches for the tenant public key 265 associated with the tenant domain. Without a certificate provisioned by the CA 240, browsers may not trust the tenant private key 250. The host private key 275 (also referred to as the asymmetric private key of the server host 210) may be protected (i.e., secured) by the key protection component 235, such that the host private key 275 is not accessible or otherwise discoverable in the memory of the server host 210.

At 345, the server host 210 may store both the encrypted tenant private key 250 and the digital certificate 260 in the database 215. As shown in the example of FIG. 2B, the database 215 may include encrypted private keys and corresponding digital certificates for each tenant supported by the server host 210. In some examples, all tenant-specific private keys stored in the database 215 may be encrypted with the same AES key (such as the symmetric key 225).

The process flow 302 of FIG. 3C illustrates an example of a TLS authentication procedure, whereby the key protection component 235 uses a tenant private key 250 provided by the server host 210 to generate a cryptographic signature 280 (also referred to as a digital signature). At 360, the server host 210 may receive (e.g., via a web browser or an application running on the client device 290) a request 270 to access a web domain associated with a tenant supported by the server host 210. At 365, the server host 210 may retrieve (i.e., from the database 215) an encrypted tenant private key 250 and corresponding digital certificate 260 for the web domain specified in the request 270. The server host 210 may also obtain (e.g., from the database 215 or the symmetric key distribution service 205) the symmetric key 225 wrapped with the host public key 220, as shown and described with reference to FIG. 2A.

At 370, the server host 210 may then pass the encrypted tenant private key 250 and the wrapped symmetric key 225 to the key protection component 235 via an API call. As described herein, the API call may be configured to cause the key protection component 235 to unwrap the symmetric key 225 using the host private key 275 accessible to the key protection component 235, decrypt the tenant private key 250 using the unwrapped symmetric key 225, and generate the cryptographic signature 280 for the digital certificate 260 using the decrypted tenant private key 250. At 375, the key protection component 235 may return the cryptographic signature 280 to the server host 210 via an API response.

At 380, the server host 210 may provide the cryptographic signature 280 and the digital certificate 260 to the client device 290, which may use the tenant public key 265 from the digital certificate 260 to validate the cryptographic signature 280. At 385, the client device 290 may exchange communications with the server host 210 in a secure manner after establishing a TLS connection with the server host 210. The TLS connection may be configured such that TLS encryption is terminated at the server host 210, thereby ensuring that data does not flow in clear (i.e., unencrypted) at any point between the client device 290 and the server host 210.

Figure 4:
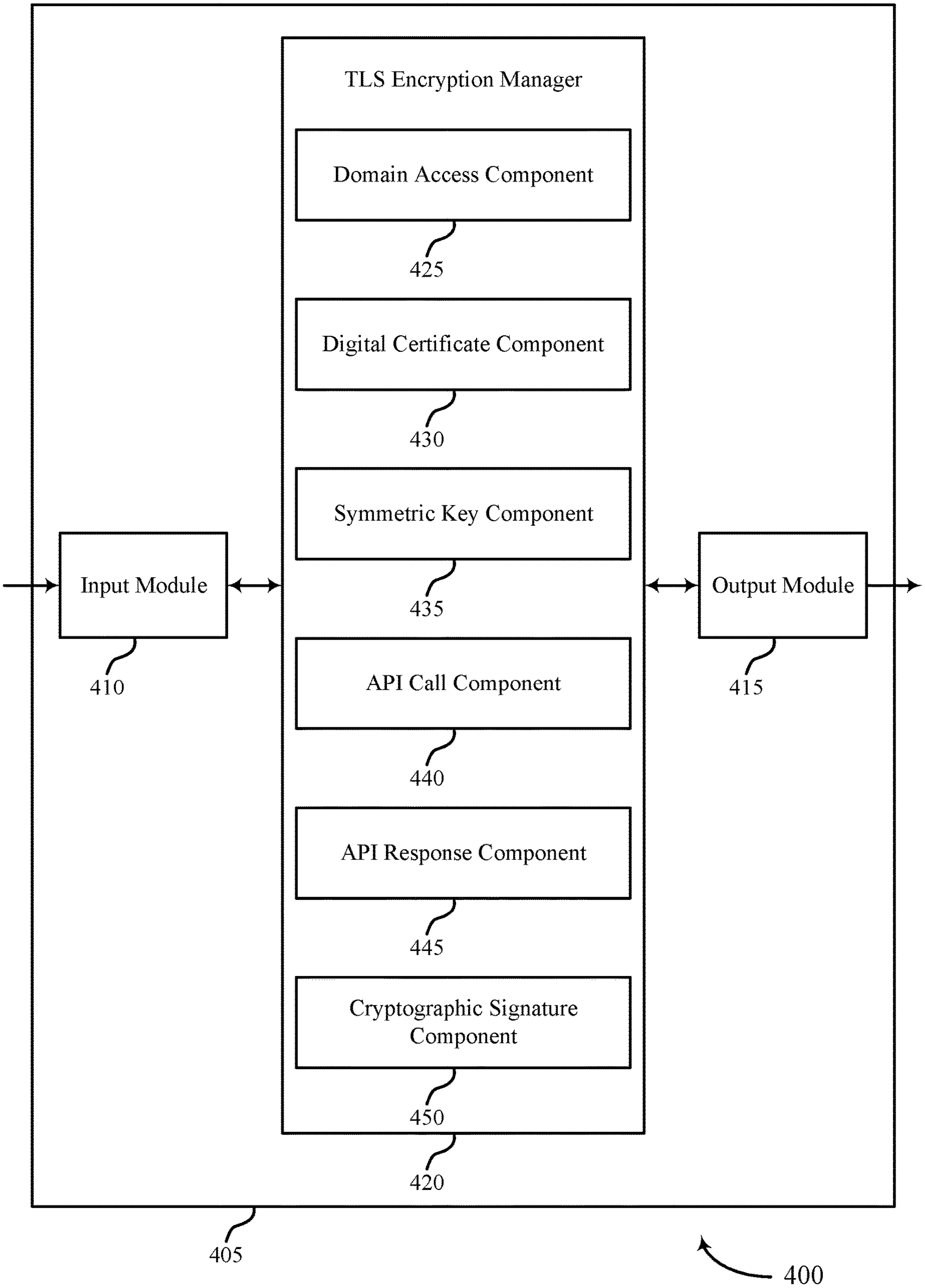
FIG. 4 shows a block diagram of an apparatus that supports multi-tenant hardware-backed TLS key management in accordance with aspects of the present disclosure.

FIG. 4 shows a block diagram 400 of a device 405 that supports multi-tenant hardware-backed TLS key management in accordance with aspects of the present disclosure. The device 405 may include an input module 410, an output module 415, and an TLS encryption manager 420. The device 405, or one of more components of the device 405 (e.g., the input module 410, the output module 415, and the TLS encryption manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the TLS encryption manager 420 to support multi-tenant hardware-backed TLS key management. In some cases, the input module 410 may be a component of an input/output (I/O) controller 610 as described with reference to FIG. 6.

The output module 415 may manage output signals for the device 405. For example, the output module 415 may receive signals from other components of the device 405, such as the TLS encryption manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the TLS encryption manager 420 may include a domain access component 425, a digital certificate component 430, a symmetric key component 435, an API call component 440, an API response component 445, a cryptographic signature component 450, or any combination thereof. In some examples, the TLS encryption manager 420, or various components thereof, may be configured to perform various operations (e.g., receiving, monitoring, transmitting) using or otherwise in cooperation with the input module 410, the output module 415, or both. For example, the TLS encryption manager 420 may receive information from the input module 410, send information to the output module 415, or be integrated in combination with the input module 410, the output module 415, or both to receive information, transmit information, or perform various other operations as described herein.

The TLS encryption manager 420 may support data processing in accordance with examples disclosed herein. The domain access component 425 may be configured to or otherwise capable of receiving, at a server host, a request to access a web domain associated with a tenant of a multi-tenant cloud platform. The digital certificate component 430 may be configured to or otherwise capable of retrieving, from a database, a digital certificate and an encrypted private key associated with the tenant of the multi-tenant cloud platform, the digital certificate including a public key associated with the tenant of the multi-tenant cloud platform. The symmetric key component 435 may be configured to or otherwise capable of obtaining a symmetric key that is wrapped using an asymmetric public key associated with the server host, where the wrapped symmetric key is provisioned by a symmetric key distribution service. The API call component 440 may be configured to or otherwise capable of transmitting an API call that includes the encrypted private key associated with the tenant of the multi-tenant cloud platform and the wrapped symmetric key provisioned by the symmetric key distribution service. The API response component 445 may be configured to or otherwise capable of receiving an API response including a cryptographic signature associated with the private key of the tenant of the multi-tenant cloud platform. The cryptographic signature component 450 may be configured to or otherwise capable of providing, to a client device associated with the request, the digital certificate associated with the tenant and the cryptographic signature associated with the private key of the tenant, where the digital certificate is used to verify the cryptographic signature.

Figure 5:
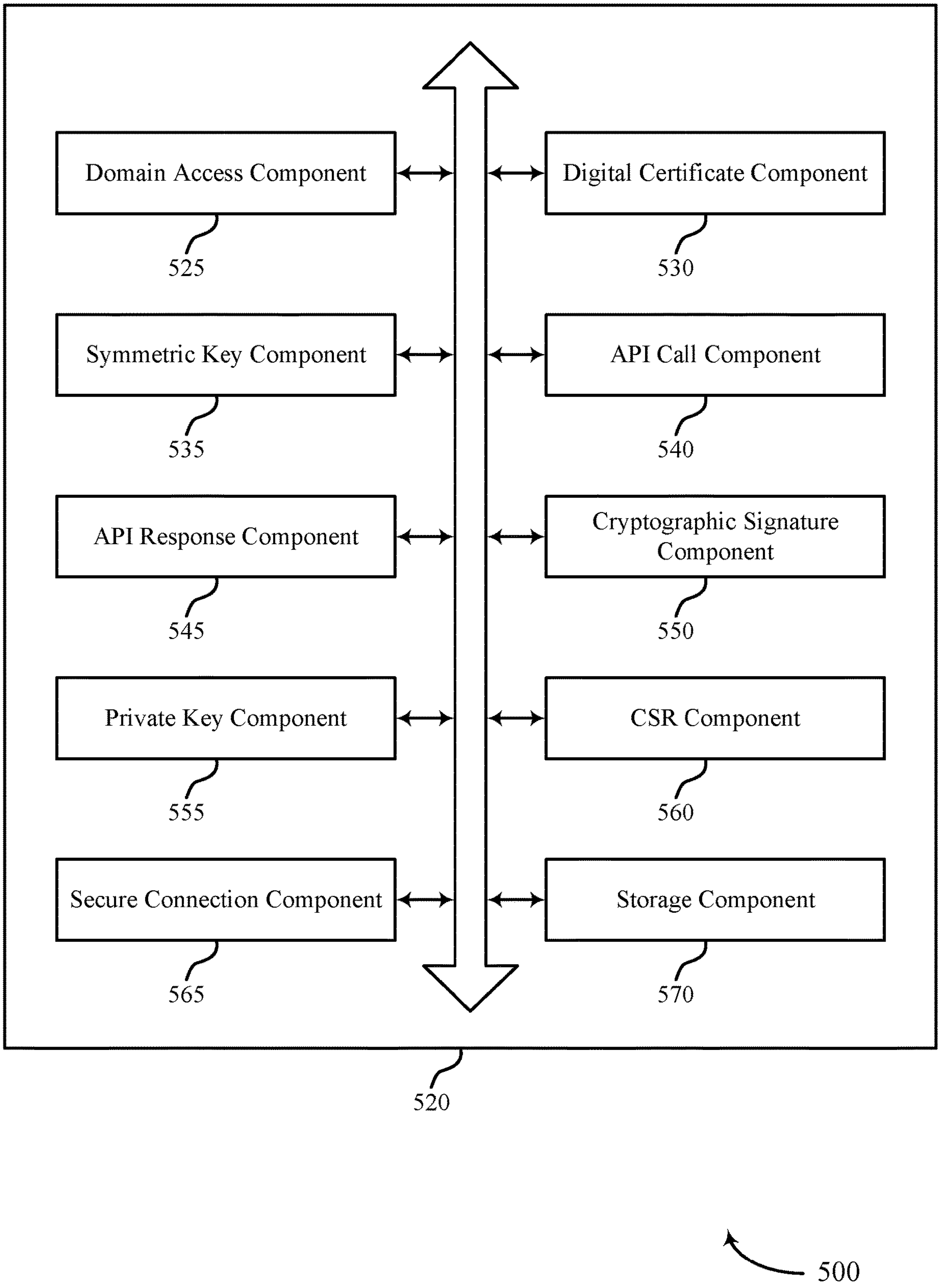
FIG. 5 shows a block diagram of an TLS encryption manager that supports multi-tenant hardware-backed TLS key management in accordance with aspects of the present disclosure.

FIG. 5 shows a block diagram 500 of an TLS encryption manager 520 that supports multi-tenant hardware-backed TLS key management in accordance with aspects of the present disclosure. The TLS encryption manager 520 may be an example of aspects of an TLS encryption manager or an TLS encryption manager 420, or both, as described herein. The TLS encryption manager 520, or various components thereof, may be an example of means for performing various aspects of multi-tenant hardware-backed TLS key management as described herein. For example, the TLS encryption manager 520 may include a domain access component 525, a digital certificate component 530, a symmetric key component 535, an API call component 540, an API response component 545, a cryptographic signature component 550, a private key component 555, an CSR component 560, a secure connection component 565, a storage component 570, or any combination thereof. Each of these components, or components of subcomponents thereof (e.g., one or more processors, one or more memories), may communicate, directly or indirectly, with one another (e.g., via one or more buses).

The TLS encryption manager 520 may support data processing in accordance with examples disclosed herein. The domain access component 525 may be configured to or otherwise capable of receiving, at a server host, a request to access a web domain associated with a tenant of a multi-tenant cloud platform. The digital certificate component 530 may be configured to or otherwise capable of retrieving, from a database, a digital certificate and an encrypted private key associated with the tenant of the multi-tenant cloud platform, the digital certificate including a public key associated with the tenant of the multi-tenant cloud platform. The symmetric key component 535 may be configured to or otherwise capable of obtaining a symmetric key that is wrapped using an asymmetric public key associated with the server host, where the wrapped symmetric key is provisioned by a symmetric key distribution service. The API call component 540 may be configured to or otherwise capable of transmitting an API call that includes the encrypted private key associated with the tenant of the multi-tenant cloud platform and the wrapped symmetric key provisioned by the symmetric key distribution service. The API response component 545 may be configured to or otherwise capable of receiving an API response including a cryptographic signature associated with the private key of the tenant of the multi-tenant cloud platform. The cryptographic signature component 550 may be configured to or otherwise capable of providing, to a client device associated with the request, the digital certificate associated with the tenant and the cryptographic signature associated with the private key of the tenant, where the digital certificate is used to verify the cryptographic signature.

In some examples, the domain access component 525 may be configured to or otherwise capable of receiving a sign-up or provisioning request for the web domain associated with the tenant of the multi-tenant cloud platform. In some examples, the private key component 555 may be configured to or otherwise capable of generating the private key for the tenant in response to the sign-up or provisioning request. In some examples, the CSR component 560 may be configured to or otherwise capable of using the private key to generate a CSR that includes a DNS name for the web domain. In some examples, the CSR component 560 may be configured to or otherwise capable of transmitting the CSR to a CA selected by the tenant.

In some examples, the digital certificate component 530 may be configured to or otherwise capable of obtaining the digital certificate from the CA in accordance with the CSR. In some examples, the private key component 555 may be configured to or otherwise capable of encrypting the private key of the tenant using the symmetric key provisioned by the symmetric key distribution service. In some examples, the storage component 570 may be configured to or otherwise capable of storing the digital certificate and the encrypted private key in the database.

In some examples, the API call may be configured to cause a key protection component of the server host to unwrap the symmetric key using an asymmetric private key of the server host, decrypt the encrypted private key of the tenant using the unwrapped symmetric key, generate the cryptographic signature using the decrypted private key of the tenant, and return the cryptographic signature via the API response.

In some examples, the secure connection component 565 may be configured to or otherwise capable of establishing a secure connection with a web browser that requested access to the web domain of the tenant after performing a successful TLS handshake procedure. In some examples, the secure connection component 565 may be configured to or otherwise capable of exchanging data with the web browser via the secure connection, where TLS encryption of the data is performed by the server host.

In some examples, to support obtaining the wrapped symmetric key, the symmetric key component 535 may be configured to or otherwise capable of transmitting, to the symmetric key distribution service, a first message including the asymmetric public key of the server host and the symmetric key wrapped with an intermediate key accessible to the symmetric key distribution service. In some examples, to support obtaining the wrapped symmetric key, the symmetric key component 535 may be configured to or otherwise capable of receiving, from the symmetric key distribution service, a second message including the symmetric key wrapped with the asymmetric public key of the server host.

In some examples, the first message may be configured to cause the symmetric key distribution service to unwrap the symmetric key using the intermediate key accessible to the symmetric key distribution service, rewrap the symmetric key using the asymmetric public key of the server host, and return the rewrapped symmetric key to the server host via the second message.

In some examples, the storage component 570 may be configured to or otherwise capable of storing, in the database, the symmetric key that is wrapped with the intermediate key accessible to the symmetric key distribution service. In some examples, the symmetric key distribution service may include an HSM, a master host, a quorum-based key sharing service, or a combination thereof.

In some examples, to support obtaining the symmetric key, the symmetric key component 535 may be configured to or otherwise capable of retrieving, from the database, the symmetric key wrapped with the asymmetric public key associated with the server host, where the database includes one or more instances of the symmetric key that are wrapped with respective asymmetric public keys associated with other server hosts in a sub-system of the multi-tenant cloud platform that includes the server host and the database.

In some examples, the database includes a set of private keys corresponding to a set of tenants of the multi-tenant cloud platform. In some examples, the set of private keys are encrypted using the same symmetric key.

In some examples, the digital certificate and the encrypted private key are stored in association with the tenant of the multi-tenant cloud platform. In some examples, the encrypted private key and the public key of the tenant are used for TLS authentication. In some examples, the symmetric key is provisioned for a sub-system of the multi-tenant cloud platform that includes the server host and the database.

Figure 6:
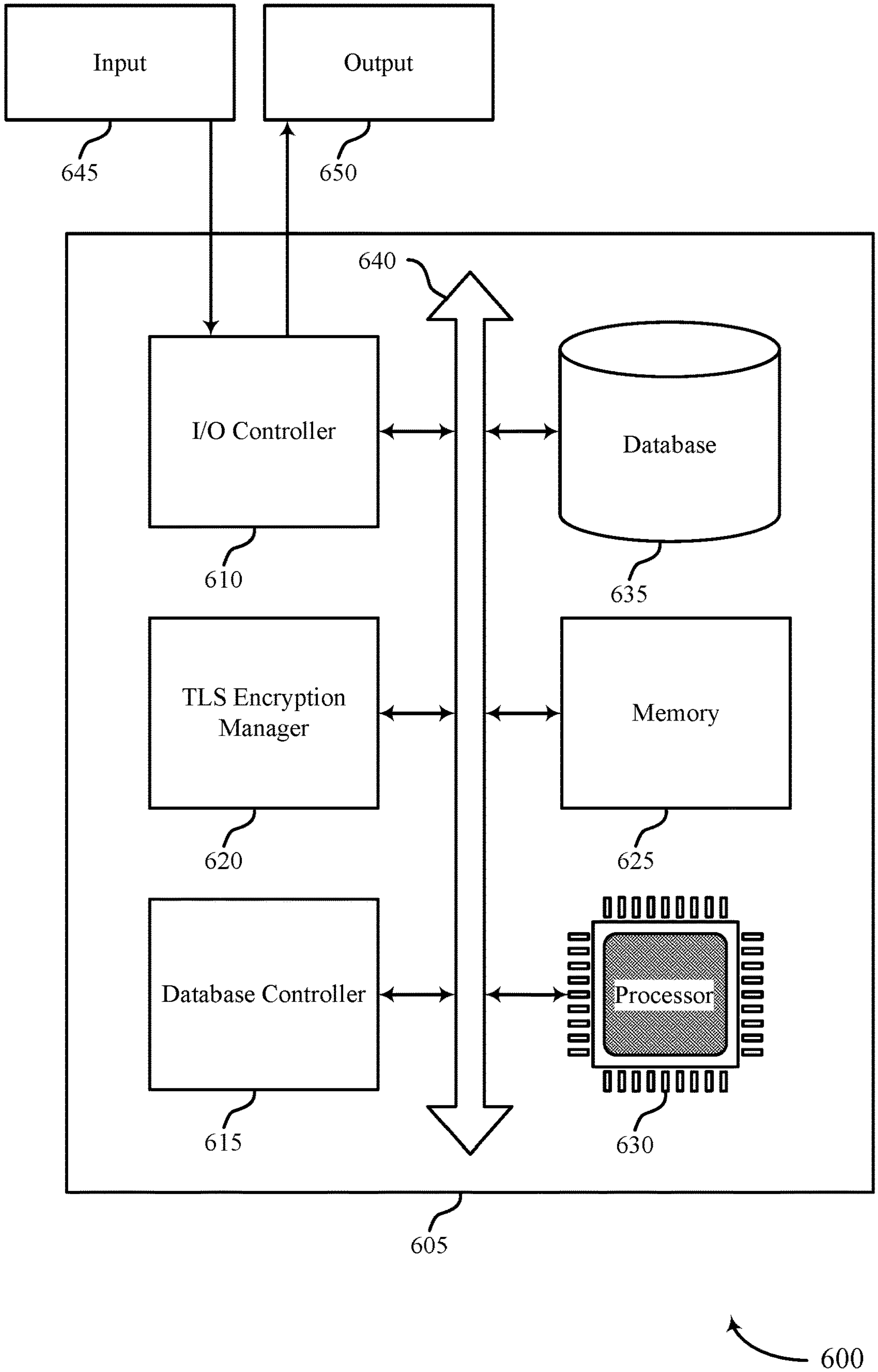
FIG. 6 shows a diagram of a system including a device that supports multi-tenant hardware-backed TLS key management in accordance with aspects of the present disclosure.

FIG. 6 shows a diagram of a system 600 including a device 605 that supports multi-tenant hardware-backed TLS key management in accordance with aspects of the present disclosure. The device 605 may be an example of or include the components of a device 405 as described herein. The device 605 may include components for bi-directional data communications including components for transmitting and receiving communications, such as an TLS encryption manager 620, an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of at least one processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause the at least one processor 630 to perform various functions described herein. In some cases, the memory 625 may contain, among other things, a basic I/O system (BIOS), which may control basic hardware or software operation such as the interaction with peripheral components or devices.

The processor 630 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the at least one processor 630 may be configured to operate a memory array using a memory controller. In other cases, a memory controller may be integrated into the at least one processor 630. The processor 630 may be configured to execute computer-readable instructions stored in a memory 625 to perform various functions (e.g., functions or tasks supporting multi-tenant hardware-backed TLS key management).

The TLS encryption manager 620 may support data processing in accordance with examples disclosed herein. For example, the TLS encryption manager 620 may be configured to or otherwise capable of receiving, at a server host, a request to access a web domain associated with a tenant of a multi-tenant cloud platform. The TLS encryption manager 620 may be configured to or otherwise capable of retrieving, from a database, a digital certificate and an encrypted private key associated with the tenant of the multi-tenant cloud platform, the digital certificate including a public key associated with the tenant of the multi-tenant cloud platform. The TLS encryption manager 620 may be configured to or otherwise capable of obtaining a symmetric key that is wrapped using an asymmetric public key associated with the server host, where the wrapped symmetric key is provisioned by a symmetric key distribution service. The TLS encryption manager 620 may be configured to or otherwise capable of transmitting an API call that includes the encrypted private key associated with the tenant of the multi-tenant cloud platform and the wrapped symmetric key provisioned by the symmetric key distribution service. The TLS encryption manager 620 may be configured to or otherwise capable of receiving an API response including a cryptographic signature associated with the private key of the tenant of the multi-tenant cloud platform. The TLS encryption manager 620 may be configured to or otherwise capable of providing, to a client device associated with the request, the digital certificate associated with the tenant and the cryptographic signature associated with the private key of the tenant, where the digital certificate is used to verify the cryptographic signature.

By including or configuring the TLS encryption manager 620 in accordance with examples as described herein, the device 605 may support techniques for improved network security, reduced latency, greater resiliency, lower storage overhead, and improved scalability, among other benefits.

Figure 7:
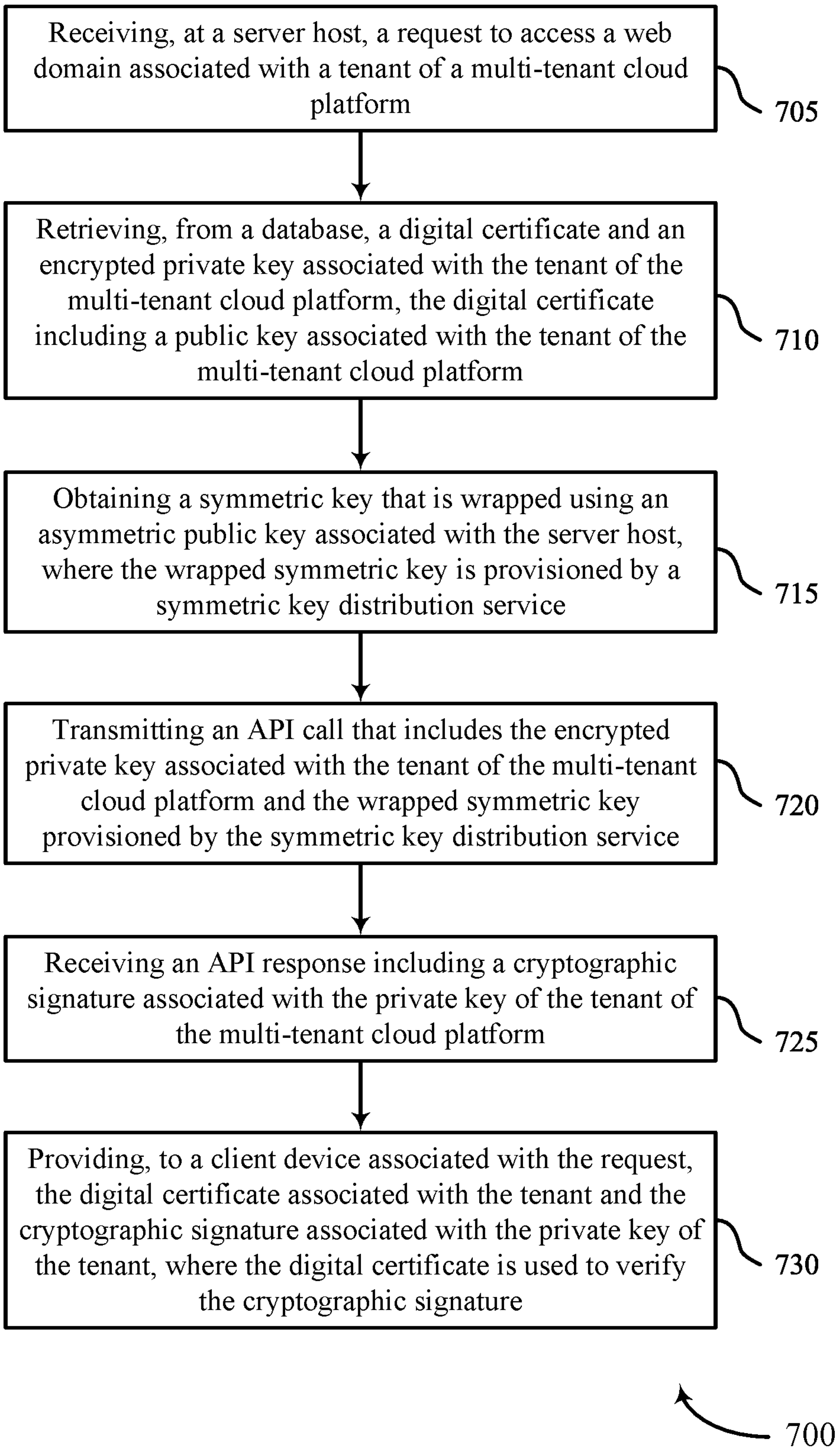
FIG. 7 shows a flowchart illustrating a method that supports multi-tenant hardware-backed TLS key management in accordance with aspects of the present disclosure.

FIG. 7 shows a flowchart illustrating a method 700 that supports multi-tenant hardware-backed TLS key management in accordance with aspects of the present disclosure. The operations of the method 700 may be implemented by a server host or components thereof, as described herein. For example, the operations of the method 700 may be performed by the server host 210, as shown and described with reference to FIGS. 2A through 3C. In some examples, the server host may execute a set of instructions to control functional elements of the server host to perform the described functions. Additionally, or alternatively, the server host may perform aspects of the described functions using special-purpose hardware.

At 705, the method 700 includes receiving, at a server host, a request to access a web domain associated with a tenant of a multi-tenant cloud platform. The operations of 705 may be performed in accordance with examples disclosed herein. In some examples, aspects of the operations of 705 may be performed by a domain access component 525, as described with reference to FIG. 5.

At 710, the method 700 includes retrieving, from a database, a digital certificate and an encrypted private key associated with the tenant of the multi-tenant cloud platform, the digital certificate including a public key associated with the tenant of the multi-tenant cloud platform. The operations of 710 may be performed in accordance with examples disclosed herein. In some examples, aspects of the operations of 710 may be performed by a digital certificate component 530, as described with reference to FIG. 5.

At 715, the method 700 includes obtaining a symmetric key that is wrapped using an asymmetric public key associated with the server host, where the wrapped symmetric key is provisioned by a symmetric key distribution service. The operations of 715 may be performed in accordance with examples disclosed herein. In some examples, aspects of the operations of 715 may be performed by a symmetric key component 535, as described with reference to FIG. 5.

At 720, the method 700 includes transmitting an API call that includes the encrypted private key associated with the tenant of the multi-tenant cloud platform and the wrapped symmetric key provisioned by the symmetric key distribution service. The operations of 720 may be performed in accordance with examples disclosed herein. In some examples, aspects of the operations of 720 may be performed by an API call component 540, as described with reference to FIG. 5.

At 725, the method 700 includes receiving an API response including a cryptographic signature associated with the private key of the tenant of the multi-tenant cloud platform. The operations of 725 may be performed in accordance with examples disclosed herein. In some examples, aspects of the operations of 725 may be performed by an API response component 545, as described with reference to FIG. 5.

At 730, the method 700 includes providing, to a client device associated with the request, the digital certificate associated with the tenant and the cryptographic signature associated with the private key of the tenant, where the digital certificate is used to verify the cryptographic signature. The operations of 730 may be performed in accordance with examples disclosed herein. In some examples, aspects of the operations of 730 may be performed by a cryptographic signature component 550, as described with reference to FIG. 5.

A method for data processing is described. The method includes: receiving, at a server host, a request to access a web domain associated with a tenant of a multi-tenant cloud platform; retrieving, from a database, a digital certificate and an encrypted private key associated with the tenant of the multi-tenant cloud platform, the digital certificate including a public key associated with the tenant of the multi-tenant cloud platform; obtaining a symmetric key that is wrapped using an asymmetric public key associated with the server host, where the wrapped symmetric key is provisioned by a symmetric key distribution service; transmitting an API call that includes the encrypted private key associated with the tenant of the multi-tenant cloud platform and the wrapped symmetric key provisioned by the symmetric key distribution service; receiving an API response including a cryptographic signature associated with the private key of the tenant of the multi-tenant cloud platform; and providing, to a client device associated with the request, the digital certificate associated with the tenant and the cryptographic signature associated with the private key of the tenant, where the digital certificate is used to verify the cryptographic signature.

An apparatus for data processing is described. The apparatus includes at least one processor, at least one memory coupled with the at least one processor, and instructions stored in the at least one memory. The instructions may be executable by the at least one processor to cause the apparatus to: receive, at a server host, a request to access a web domain associated with a tenant of a multi-tenant cloud platform; retrieve, from a database, a digital certificate and an encrypted private key associated with the tenant of the multi-tenant cloud platform, the digital certificate including a public key associated with the tenant of the multi-tenant cloud platform; obtain a symmetric key that is wrapped using an asymmetric public key associated with the server host, where the wrapped symmetric key is provisioned by a symmetric key distribution service; transmit an API call that includes the encrypted private key associated with the tenant of the multi-tenant cloud platform and the wrapped symmetric key provisioned by the symmetric key distribution service; receive an API response including a cryptographic signature associated with the private key of the tenant of the multi-tenant cloud platform; and provide, to a client device associated with the request, the digital certificate associated with the tenant and the cryptographic signature associated with the private key of the tenant, where the digital certificate is used to verify the cryptographic signature.

Another apparatus for data processing is described. The apparatus includes: means for receiving, at a server host, a request to access a web domain associated with a tenant of a multi-tenant cloud platform; means for retrieving, from a database, a digital certificate and an encrypted private key associated with the tenant of the multi-tenant cloud platform, the digital certificate including a public key associated with the tenant of the multi-tenant cloud platform; means for obtaining a symmetric key that is wrapped using an asymmetric public key associated with the server host, where the wrapped symmetric key is provisioned by a symmetric key distribution service; means for transmitting an API call that includes the encrypted private key associated with the tenant of the multi-tenant cloud platform and the wrapped symmetric key provisioned by the symmetric key distribution service; means for receiving an API response including a cryptographic signature associated with the private key of the tenant of the multi-tenant cloud platform; and means for providing, to a client device associated with the request, the digital certificate associated with the tenant and the cryptographic signature associated with the private key of the tenant, where the digital certificate is used to verify the cryptographic signature.

A non-transitory computer-readable medium storing code for data processing is described. The code includes instructions executable by at least one processor to: receive, at a server host, a request to access a web domain associated with a tenant of a multi-tenant cloud platform; retrieve, from a database, a digital certificate and an encrypted private key associated with the tenant of the multi-tenant cloud platform, the digital certificate including a public key associated with the tenant of the multi-tenant cloud platform; obtain a symmetric key that is wrapped using an asymmetric public key associated with the server host, where the wrapped symmetric key is provisioned by a symmetric key distribution service; transmit an API call that includes the encrypted private key associated with the tenant of the multi-tenant cloud platform and the wrapped symmetric key provisioned by the symmetric key distribution service; receive an API response including a cryptographic signature associated with the private key of the tenant of the multi-tenant cloud platform; and transmit an indication of the digital certificate that includes the cryptographic signature associated with the private key of the tenant of the multi-tenant cloud platform.

Some examples of the methods, apparatuses, and non-transitory computer-readable media described herein may further include operations, features, means, or instructions for: receiving a sign-up or provisioning request for the web domain associated with the tenant of the multi-tenant cloud platform; generating the private key for the tenant in response to the sign-up or provisioning request; using the private key to generate a CSR that includes a DNS name for the web domain; and transmitting the CSR to a CA selected by the tenant.

Some examples of the methods, apparatuses, and non-transitory computer-readable media described herein may further include operations, features, means, or instructions for: obtaining the digital certificate from the CA in accordance with the CSR; encrypting the private key of the tenant using the symmetric key provisioned by the symmetric key distribution service; and storing the digital certificate and the encrypted private key in the database.

In some examples of the methods, apparatuses, and non-transitory computer-readable media described herein, the API call may be configured to cause a key protection component of the server host to: unwrap the symmetric key using an asymmetric private key of the server host; decrypt the encrypted private key of the tenant using the unwrapped symmetric key; generate the cryptographic signature using the decrypted private key of the tenant; and return the cryptographic signature via the API response.

Some examples of the methods, apparatuses, and non-transitory computer-readable media described herein may further include operations, features, means, or instructions for: establishing a secure connection with a web browser that requested access to the web domain of the tenant after performing a successful TLS handshake procedure; and exchanging data with the web browser via the secure connection, where TLS encryption of the data is performed by the server host.

In some examples of the methods, apparatuses, and non-transitory computer-readable media described herein, obtaining the wrapped symmetric key may include operations, features, means, or instructions for: transmitting, to the symmetric key distribution service, a first message including the asymmetric public key of the server host and the symmetric key wrapped with an intermediate key accessible to the symmetric key distribution service; and receiving, from the symmetric key distribution service, a second message including the symmetric key wrapped with the asymmetric public key of the server host.

In some examples of the methods, apparatuses, and non-transitory computer-readable media described herein, the first message may be configured to cause the symmetric key distribution service to: unwrap the symmetric key using the intermediate key accessible to the symmetric key distribution service; rewrap the symmetric key using the asymmetric public key of the server host; and return the rewrapped symmetric key to the server host via the second message.

Some examples of the methods, apparatuses, and non-transitory computer-readable media described herein may further include operations, features, means, or instructions for storing, in the database, the symmetric key that is wrapped with the intermediate key accessible to the symmetric key distribution service.

In some examples of the methods, apparatuses, and non-transitory computer-readable media described herein, the symmetric key distribution service includes an HSM, a master host, a quorum-based key sharing service, or a combination thereof.

In some examples of the methods, apparatuses, and non-transitory computer-readable media described herein, obtaining the symmetric key may include operations, features, means, or instructions for retrieving, from the database, the symmetric key wrapped with the asymmetric public key associated with the server host, where the database includes one or more instances of the symmetric key that are wrapped with respective asymmetric public keys associated with other server hosts in a sub-system of the multi-tenant cloud platform that includes the server host and the database.

In some examples of the methods, apparatuses, and non-transitory computer-readable media described herein, the database includes a set of private keys corresponding to a set of tenants of the multi-tenant cloud platform, and the set of private keys are encrypted using the same symmetric key.

In some examples of the methods, apparatuses, and non-transitory computer-readable media described herein, the digital certificate and the encrypted private key are stored in association with the tenant of the multi-tenant cloud platform.

In some examples of the methods, apparatuses, and non-transitory computer-readable media described herein, the encrypted private key and the public key of the tenant may be used for TLS authentication.

In some examples of the methods, apparatuses, and non-transitory computer-readable media described herein, the symmetric key may be provisioned for a sub-system of the multi-tenant cloud platform that includes the server host and the database.

The Following Provides an Overview of Aspects of the Present Disclosure:

Aspect 1: A method for data processing, including: receiving, at a server host, a request to access a web domain associated with a tenant of a multi-tenant cloud platform; retrieving, from a database, a digital certificate and an encrypted private key associated with the tenant of the multi-tenant cloud platform, the digital certificate including a public key associated with the tenant of the multi-tenant cloud platform; obtaining a symmetric key that is wrapped using an asymmetric public key associated with the server host, where the wrapped symmetric key is provisioned by a symmetric key distribution service; transmitting an API call that includes the encrypted private key associated with the tenant of the multi-tenant cloud platform and the wrapped symmetric key provisioned by the symmetric key distribution service; receiving an API response including a cryptographic signature associated with the private key of the tenant of the multi-tenant cloud platform; and providing, to a client device associated with the request, the digital certificate associated with the tenant and the cryptographic signature associated with the private key of the tenant, where the digital certificate is used to verify the cryptographic signature.

Aspect 2: The method of aspect 1, further including: receiving a sign-up or provisioning request for the web domain associated with the tenant of the multi-tenant cloud platform; generating the private key for the tenant in response to the sign-up or provisioning request; using the private key to generate a CSR that includes a DNS name for the web domain; and transmitting the CSR to a CA selected by the tenant.

Aspect 3: The method of aspect 2, further including: obtaining the digital certificate from the CA in accordance with the CSR; encrypting the private key of the tenant using the symmetric key provisioned by the symmetric key distribution service; and storing the digital certificate and the encrypted private key in the database.

Aspect 4: The method of any of aspects 1 through 3, where the API call is configured to cause a key protection component of the server host to unwrap the symmetric key using an asymmetric private key of the server host; decrypt the encrypted private key of the tenant using the unwrapped symmetric key; generate the cryptographic signature using the decrypted private key of the tenant; and return the cryptographic signature via the API response.

Aspect 5: The method of any of aspects 1 through 4, further including: establishing a secure connection with a web browser that requested access to the web domain of the tenant after performing a successful TLS handshake procedure; and exchanging data with the web browser via the secure connection, where TLS encryption of the data is performed by the server host.

Aspect 6: The method of any of aspects 1 through 5, where obtaining the wrapped symmetric key includes: transmitting, to the symmetric key distribution service, a first message including the asymmetric public key of the server host and the symmetric key wrapped with an intermediate key accessible to the symmetric key distribution service; and receiving, from the symmetric key distribution service, a second message including the symmetric key wrapped with the asymmetric public key of the server host.

Aspect 7: The method of aspect 6, where the first message is configured to cause the symmetric key distribution service to unwrap the symmetric key using the intermediate key accessible to the symmetric key distribution service; rewrap the symmetric key using the asymmetric public key of the server host; and return the rewrapped symmetric key to the server host via the second message.

Aspect 8: The method of any of aspects 6 through 7, further including: storing, in the database, the symmetric key that is wrapped with the intermediate key accessible to the symmetric key distribution service.

Aspect 9: The method of any of aspects 6 through 8, where the symmetric key distribution service includes an HSM, a master host, a quorum-based key sharing service, or a combination thereof.

Aspect 10: The method of any of aspects 1 through 9, where obtaining the symmetric key includes: retrieving, from the database, the symmetric key wrapped with the asymmetric public key associated with the server host, where the database includes one or more instances of the symmetric key that are wrapped with respective asymmetric public keys associated with other server hosts in a subsystem of the multi-tenant cloud platform that includes the server host and the database.

Aspect 11: The method of any of aspects 1 through 10, where the database includes a set of private keys corresponding to a set of tenants of the multi-tenant cloud platform; and the set of private keys are encrypted using the symmetric key.

Aspect 12: The method of any of aspects 1 through 11, where the digital certificate and the encrypted private key are stored in association with the tenant of the multi-tenant cloud platform.

Aspect 13: The method of any of aspects 1 through 12, where the encrypted private key and the public key of the tenant are used for TLS authentication.

Aspect 14: The method of any of aspects 1 through 13, where the symmetric key is provisioned for a sub-system of the multi-tenant cloud platform that includes the server host and the database.

Aspect 15: An apparatus for data processing, including: at least one processor; at least one memory coupled with the at least one processor; and instructions stored in the at least one memory, where the instructions are executable by the at least one processor to cause the apparatus to perform a method of any of aspects 1 through 14.

Aspect 16: An apparatus for data processing, including: at least one means for performing a method of any of aspects 1 through 14.

Aspect 17: A non-transitory computer-readable medium storing code for data processing, the code including instructions that are executable by at least one processor to perform a method of any of aspects 1 through 14.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by at least one processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

Likewise, any functions or operations described herein as being capable of being performed by at least one memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a server host, a request to access a web domain associated with a tenant of a multi-tenant cloud platform;

retrieving, from a database, a digital certificate and an encrypted private key associated with the tenant of the multi-tenant cloud platform, the digital certificate comprising a public key associated with the tenant of the multi-tenant cloud platform;

obtaining a symmetric key that is wrapped using an asymmetric public key associated with the server host, wherein the wrapped symmetric key is provisioned by a symmetric key distribution service;

transmitting an application programming interface (API) call that includes the encrypted private key associated with the tenant of the multi-tenant cloud platform and the wrapped symmetric key provisioned by the symmetric key distribution service;

receiving an API response comprising a cryptographic signature associated with the private key of the tenant of the multi-tenant cloud platform; and providing, to a client device associated with the request, the digital certificate associated with the tenant and the cryptographic signature associated with the private key of the tenant, wherein the digital certificate is used to verify the cryptographic signature.

2. The method of claim 1, further comprising:

receiving a sign-up or provisioning request for the web domain associated with the tenant of the multi-tenant cloud platform;

generating the private key for the tenant in response to the sign-up or provisioning request;

using the private key to generate a certificate signing request (CSR) that includes a domain name system (DNS) name for the web domain; and transmitting the CSR to a certificate authority (CA) selected by the tenant.

3. The method of claim 2, further comprising:

obtaining the digital certificate from the CA in accordance with the CSR;

encrypting the private key of the tenant using the symmetric key provisioned by the symmetric key distribution service; and storing the digital certificate and the encrypted private key in the database.

4. The method of claim 1, wherein the API call is configured to cause a key protection component of the server host to:

unwrap the symmetric key using an asymmetric private key of the server host;

decrypt the encrypted private key of the tenant using the unwrapped symmetric key;

generate the cryptographic signature using the decrypted private key of the tenant; and return the cryptographic signature via the API response.

5. The method of claim 1, further comprising:

establishing a secure connection with a web browser that requested access to the web domain of the tenant after performing a successful transport layer security (TLS) handshake procedure; and exchanging data with the web browser via the secure connection, wherein TLS encryption of the data is performed by the server host.

6. The method of claim 1, wherein obtaining the wrapped symmetric key comprises:

transmitting, to the symmetric key distribution service, a first message comprising the asymmetric public key of the server host and the symmetric key wrapped with an intermediate key accessible to the symmetric key distribution service; and receiving, from the symmetric key distribution service, a second message comprising the symmetric key wrapped with the asymmetric public key of the server host.

7. The method of claim 6, wherein the first message is configured to cause the symmetric key distribution service to:

unwrap the symmetric key using the intermediate key accessible to the symmetric key distribution service;

rewrap the symmetric key using the asymmetric public key of the server host; and return the rewrapped symmetric key to the server host via the second message.

8. The method of claim 6, further comprising:

storing, in the database, the symmetric key that is wrapped with the intermediate key accessible to the symmetric key distribution service.

9. The method of claim 6, wherein the symmetric key distribution service comprises a hardware security module (HSM), a master host, a quorum-based key sharing service, or a combination thereof.

10. The method of claim 1, wherein obtaining the symmetric key comprises:

retrieving, from the database, the symmetric key wrapped with the asymmetric public key associated with the server host, wherein the database comprises one or more instances of the symmetric key that are wrapped with respective asymmetric public keys associated with other server hosts in a sub-system of the multi-tenant cloud platform that includes the server host and the database.

11. The method of claim 1, wherein:

the database comprises a plurality of private keys corresponding to a plurality of tenants of the multi-tenant cloud platform; and the plurality of private keys are encrypted using the symmetric key.

12. The method of claim 1, wherein the digital certificate and the encrypted private key are stored in association with the tenant of the multi-tenant cloud platform.

13. The method of claim 1, wherein the encrypted private key and the public key of the tenant are used for transport layer security (TLS) authentication.

14. The method of claim 1, wherein the symmetric key is provisioned for a sub-system of the multi-tenant cloud platform that includes the server host and the database.

15. An apparatus for data processing, comprising:

at least one processor;

at least one memory coupled with the at least one processor; and instructions stored in the at least one memory and executable by the at least one processor to cause the apparatus to:

receive, at a server host, a request to access a web domain associated with a tenant of a multi-tenant cloud platform;

retrieve, from a database, a digital certificate and an encrypted private key associated with the tenant of the multi-tenant cloud platform, the digital certificate comprising a public key associated with the tenant of the multi-tenant cloud platform;

obtain a symmetric key that is wrapped using an asymmetric public key associated with the server host, wherein the wrapped symmetric key is provisioned by a symmetric key distribution service;

transmit an application programming interface (API) call that includes the encrypted private key associated with the tenant of the multi-tenant cloud platform and the wrapped symmetric key provisioned by the symmetric key distribution service;

receive an API response comprising a cryptographic signature associated with the private key of the tenant of the multi-tenant cloud platform; and provide, to a client device associated with the request, the digital certificate associated with the tenant and the cryptographic signature associated with the private key of the tenant, wherein the digital certificate is used to verify the cryptographic signature.

16. The apparatus of claim 15, wherein the instructions are further executable by the at least one processor to cause the apparatus to:

receive a sign-up or provisioning request for the web domain associated with the tenant of the multi-tenant cloud platform;

generate the private key for the tenant in response to the sign-up or provisioning request;

use the private key to generate a certificate signing request (CSR) that includes a domain name system (DNS) name for the web domain; and transmit the CSR to a certificate authority (CA) selected by the tenant.

17. The apparatus of claim 16, wherein the instructions are further executable by the at least one processor to cause the apparatus to:

obtain the digital certificate from the CA in accordance with the CSR;

encrypt the private key of the tenant using the symmetric key provisioned by the symmetric key distribution service; and store the digital certificate and the encrypted private key in the database.

18. The apparatus of claim 15, wherein:

unwrap the symmetric key using an asymmetric private key of the server host;

decrypt the encrypted private key of the tenant using the unwrapped symmetric key;

generate the cryptographic signature using the decrypted private key of the tenant; and return the cryptographic signature via the API response.

19. The apparatus of claim 15, wherein the instructions are further executable by the at least one processor to cause the apparatus to:

establish a secure connection with a web browser that requested access to the web domain of the tenant after performing a successful transport layer security (TLS) handshake procedure; and exchange data with the web browser via the secure connection, wherein TLS encryption of the data is performed by the server host.

20. A non-transitory computer-readable medium storing code for data processing, the code comprising instructions executable by at least one processor to:

receive, at a server host, a request to access a web domain associated with a tenant of a multi-tenant cloud platform;

retrieve, from a database, a digital certificate and an encrypted private key associated with the tenant of the multi-tenant cloud platform, the digital certificate comprising a public key associated with the tenant of the multi-tenant cloud platform;

obtain a symmetric key that is wrapped using an asymmetric public key associated with the server host, wherein the wrapped symmetric key is provisioned by a symmetric key distribution service;

transmit an application programming interface (API) call that includes the encrypted private key associated with the tenant of the multi-tenant cloud platform and the wrapped symmetric key provisioned by the symmetric key distribution service;

receive an API response comprising a cryptographic signature associated with the private key of the tenant of the multi-tenant cloud platform; and provide, to a client device associated with the request, the digital certificate associated with the tenant and the cryptographic signature associated with the private key of the tenant, where the digital certificate is used to verify the cryptographic signature.

* * * * *